3,234,164
CONVERSION OF NON-FUSIBLE AND INSOLUBLE POLYACROLEINS WITH HYDROXYL AMINE
Werner Kern, Mainz, Otto Schweitzer, Konigstein, Taunus, and Rolf Schulz, Mainz (Rhine), Germany, assignors to Deutsche Gold- und Silber-Scheideanstalt vormals Roessler, Frankfurt am Main, Germany
No Drawing. Filed June 12, 1962, Ser. No. 201,756
Claims priority, application Germany, Mar. 23, 1955, D 20,095; Jan. 21, 1956, D 22,164
2 Claims. (Cl. 260—29.6)

The present invention relates to a process for the treatment of non-fusible homopolymers of acrolein which contain substantially no free aldehyde groups and which are normally insoluble in normal organic solvents to convert them into more valuable products and especially products which are soluble in a number of solvents.

It is known that unstabilized acrolein spontaneously polymerizes upon standing to produce a solid, non-fusible and insoluble product which has been designated as "disacryl." (Redtenbacher, Liebigs Ann. Chem. 47 (1843), p. 113.) Acrolein furthermore polymerizes under the influence of radical forming catalysts to produce infusible polymers which are insoluble in the known organic solvents. It therefore was previously assumed that hardly any double bonds or aldehyde groups were retained in such polymers and that therefore the polyacroleins are unsuited for the production of polyaldehydes (Houben-Weyl, vol. VII, pages 133–135). It was only in certain oligomers of acrolein (Gilbert, Donleavy, J. Amer. Chem. Soc. 60 (1938), p. 1911) that certain copolymers of acrolein with other vinyl compounds that reactive aldehyde groups could be ascertained. The homopolymers of acrolein were previously considered rather unreactive and achieved no technical significance (Schildknecht, Vinyl and Related Polymers, Wiley and Sons, New York, 1952, page 700).

According to the invention it was unexpectedly discovered that the homopolymers of acrolein contrary to prior indications do contain aldehyde groups but that these are in the form of aldehyde-hydrate-ether groupings and therefore not free and that the intermolecular ether groupings are the cause of the cross-linking and therefore their infusibility and insolubility, as indicated in the following formula:

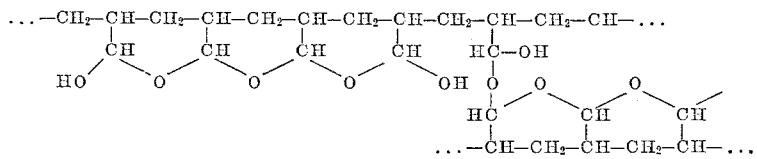

Furthermore, according to the invention it was found unexpectedly that these masked aldehyde groups which are present in all such macromolecular homopolymers of acrolein which are infusible and normally insoluble in all common organic solvents and which are produced by spontaneous or radical polymerization using radical forming catalysts such as redox systems and are macromolecular, having molecular weights above 10,000 (see Staudinger, Makromolekulare Chemie & Biologie, page 4, 1947, Basel), can be caused to react with hydroxyl amine compounds, preferably hydroxyl amine salts such as hydroxyl amine hydrochloride or sulfate in the presence of an alkali in an aqueous medium to form oximes.

It was surprising that it is possible to react the infusible, insoluble homopolymers of acrolein obtained by spontaneous or radical polymerization under the heterogeneous reaction conditions required. That is, the polyacrolein at the beginning of the reaction is present in solid undissolved form and only the resulting derivative goes into solution as the reaction proceeds. The polyacrolein oximes which are formed form water soluble alkali metal salts which can be precipitated by acidification as they are capable of forming specific metal salts that can be used as specific ion exchange agents.

The reactions according to the invention can be carried out at room temperature but moderately raised temperatures expedite the reactions. Temperatures over 150° C. can engender side reactions which may cause the reaction product to lose its stability. For convenience, it is preferable to employ temperature not over the normal boiling point of the aqueous solutions preferably employed for the reaction.

In the reactions according to the invention the polyacroleins employed are not degraded to form monomeric acrolein and therefore the polyacroleins do not serve as a source of monomeric acrolein.

The oxime derivatives of polyacrolein obtained according to the invention in addition to being useful as ion exchange agents can also be used as wash primers for the surface treatment of textiles, skins and leather.

The following examples will serve to illustrate several embodiments of the invention:

*Example 1*

1 gram of polyacrolein obtained by spontaneous polymerization was suspended in a solution of 2 grams of hydroxylamine hydrochloride in 50 cc. of N aqueous sodium hydroxide and the suspension shaken at room temperature for 24 hours. The resulting mixture was then heated for 1–2 hours at 50° C. and the small quantities of undissolved material were removed from the solution. Upon acidification of the solution with 2 N acetic acid, a yellowish product was precipitated which in damp state was easily soluble in aqueous sodium hydroxide. After five-fold reprecipitation, its nitrogen content was 12%.

*Example 2*

0.5 gram of an acrolein polymer obtained by polymerization of acrolein in the presence of an iron redox catalyst in aqueous solution was shaken during 24 hours at room temperature with a solution of 1 gram hydroxylamine hydrochloride in 25 cc. of 2 N aqueous NaOH. The mixture was then treated as described in Example 1.

We claim:
1. A method of rendering a macromolecular infusible, insoluble homopolymer of acrolein devoid of free aldehyde groups selected from the group consisting of polyacroleins produced by spontaneous polymerization and polyacroleins produced by radical polymerization soluble in aqueous sodium hydroxide which comprises reacting such homopolymer with hydroxylamine in an aqueous alkaline medium.

2. A polyacrolein oxime produced according to claim 1.

(References on following page)

References Cited by the Examiner

UNITED STATES PATENTS

| | | | |
|---|---|---|---|
| 2,161,808 | 6/1939 | Finlayson et al. | 260—72 |
| 2,657,192 | 10/1953 | Miller et al. | 269—67 |
| 2,784,174 | 3/1957 | Hartough et al. | 260—72 |
| 2,985,610 | 5/1961 | Blanchette et al. | 260—67 |
| 2,993,878 | 7/1961 | Marks | 260—67 |

FOREIGN PATENTS 751,934   7/1956   Great Britain.

OTHER REFERENCES

English Translation of Kunststoffe, vol. 53, July 1963, pages 424–436; pages 11–21.

WILLIAM H. SHORT, *Primary Examiner.*

J. R. LIBERMAN, *Examiner.*